United States Patent [19]

Retz

[11] 4,382,746
[45] May 10, 1983

[54] VORTEX TURBINE APPARATUS

[76] Inventor: Philip Retz, 1783 Lanier Pl., NW., Washington, D.C. 20009

[21] Appl. No.: 265,546

[22] Filed: May 20, 1981

[51] Int. Cl.³ .......................... F03B 1/02; F03B 5/00
[52] U.S. Cl. ..................................... 415/202; 415/90
[58] Field of Search .................. 415/90, 91, 202, 81, 415/1; 416/197 B, 4, 1

[56] References Cited

U.S. PATENT DOCUMENTS

| | | | |
|---|---|---|---|
| 509,644 | 11/1893 | Bardsley | 415/90 |
| 659,652 | 10/1900 | De Remer | 416/197 B |
| 1,047,898 | 12/1912 | Scott | 415/90 |
| 1,056,338 | 3/1913 | Johnsen | 415/90 |
| 1,603,599 | 10/1926 | Heibl | 415/91 |
| 1,798,679 | 3/1931 | Kelliher | 415/202 |
| 2,835,202 | 5/1958 | Lauck | 415/89 |
| 3,372,905 | 3/1968 | Brown | 415/1 X |
| 3,877,835 | 4/1975 | Siptrott | 415/202 |
| 4,272,685 | 6/1981 | Toyama | 415/91 X |

*Primary Examiner*—Leonard E. Smith
*Attorney, Agent, or Firm*—Saidman, Sterne & Kessler

[57] ABSTRACT

An energy conversion apparatus includes a turbine-like structure for converting water pressure to rotary motion. A vortex is set up within the structure and is used to enhance the power output of the device. The apparatus includes a drum for receiving water from a plurality of nozzles, and a plurality of lugs disposed on an interior surface of an upper portion of the drum. The lugs presenting a reaction surface to the water supplied by the nozzles from a pressure line for rotating the drum. The drum is elongated to provide an opportunity for a vortex to develop. The vortex is enhanced by the shape of the drum which presents a cross-section having a tapered portion which narrows progressively downwardly. The resultant vortex applies further rotational force to the interior surface of the drum, and more specifically to vanes provided within the drum for reacting with the vortex. Some of the lugs are connected to a central shaft by radial arms at a top opening of the drum. The drum rotates along with the central shaft, the radial arms providing a downdraft thereby to minimize frothing, foaming and the like. Upon exiting through a narrow bottom opening of the drum, the water is propelled against an augmentor, which includes a substantially inverted-dish shape having a plurality of stays connecting its periphery to the bottom opening of the drum. The stays are upwardly pitched in the forward direction, as are the upper radial arms of the drum, thus providing a further downdraft within the apparatus. Additional vanes are provided on the upper surface of the inverted dish, in order further to utilize on the vortex action. The dished portion of the augmentor, as well as the upper arms of the drum, are connected to a portion of the shaft, thereby rotating the shaft which is mounted by tapered bearings in a support structure therefor. A pulley is mounted on the external portion of the shaft for driving an external device by the motive power generated therein. In an alternative embodiment, additional nozzles are provided for directing water against a second plurality of lugs disposed on the outer periphery of the outer portion of the drum. For such a structure, the surrounding tailings box includes an inner surface shaped similarly to the outer shape of the drum, thereby enhancing a vortex action which also directs expended water from the external lugs also against the augmentor.

40 Claims, 18 Drawing Figures

FIG. 13
FIG. 14
FIG. 15
FIG. 16
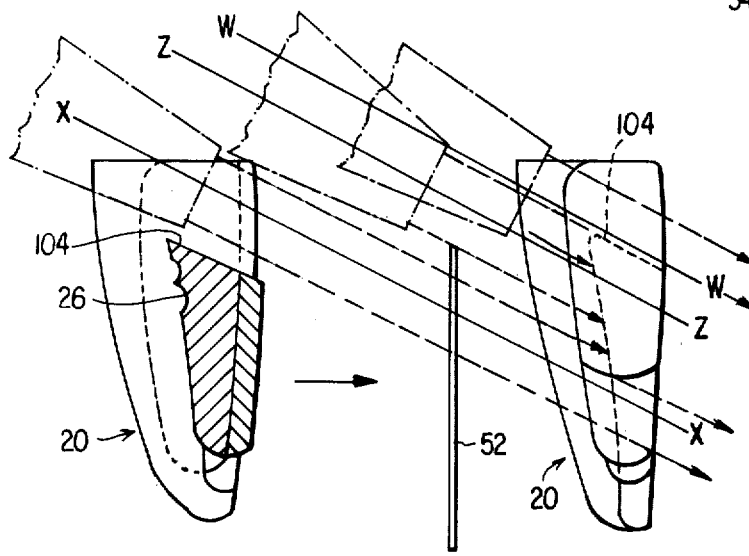
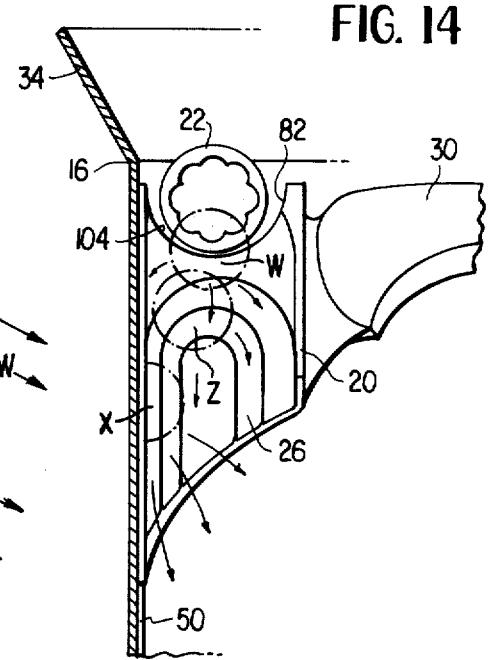
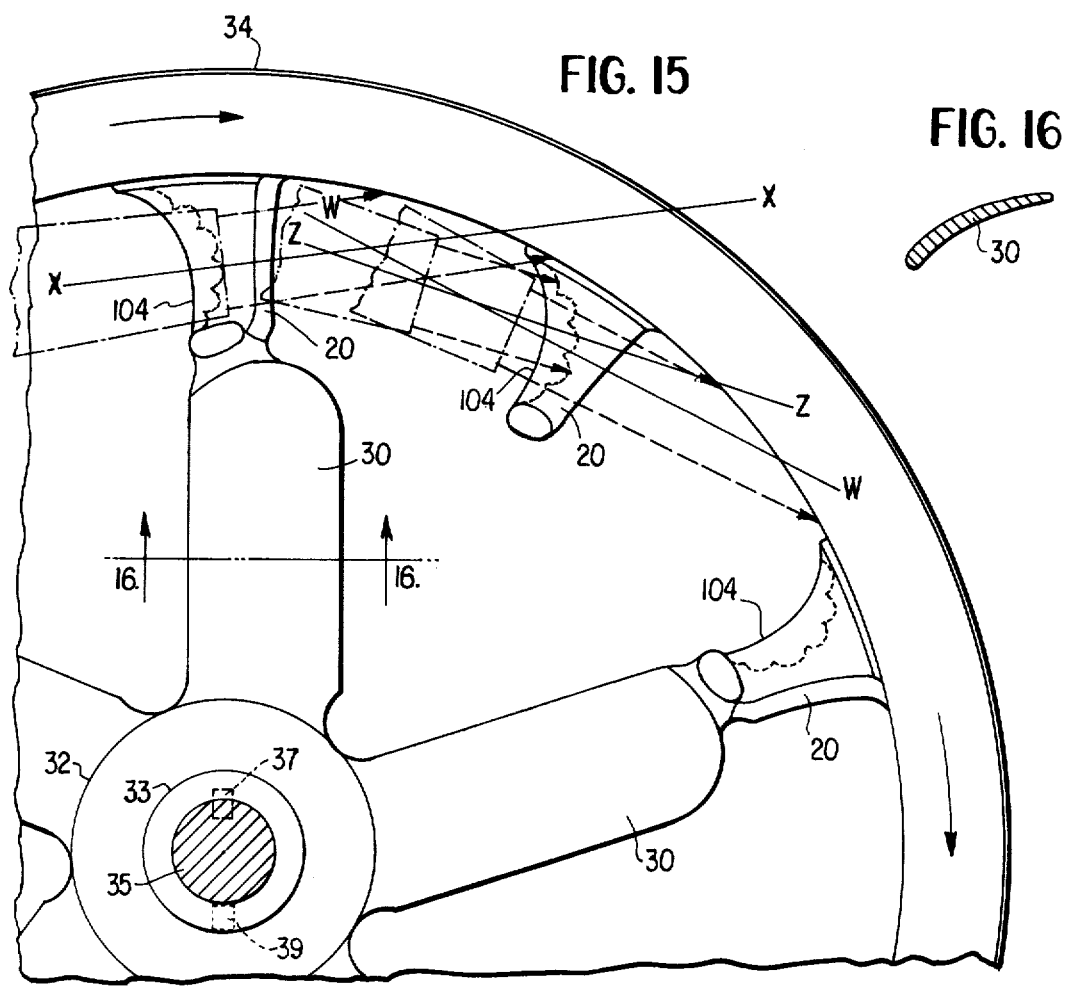
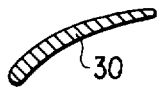

2

VORTEX TURBINE APPARATUS

BACKGROUND OF THE INVENTION

1. Field of the Invention

This invention relates to water operated motive systems, and more particularly to systems utilizing a vortex phenomenon to provide increased output power and more efficient operation of the system.

2. Description of the Prior Art

Turbine systems for converting water pressure to rotary motion are known in the prior art.

For example, U.S. Pat. No. 2,685,652 to Wales generates electric power with a turbine including a number of rotors, providing three sets of blades for turning the rotors in opposite directions. A motivating fluid is delivered to the blades from a spiral or from a large nozzle. One set of blades is arranged at an angle to receive the impact of the gravitating fluid after its initial velocity and impact have been consumed in imparting motion to the first and second sets of blades. The blades are disclosed as being flat and as having a substantially vertical arrangement. The stream of water is delivered under pressure in a horizontal plane tangential to the surface of the rotors and, along with the impact of falling water which has passed through the blades, effects rotation of the rotors. The residue of forward, tangential motion of the water is imparted to a subjacent set of blades and water flowing through the holes provided in the platform acts upon a further set of blades to impart further rotation of the rotors. However, the reference neither contemplates nor suggests a substantial source of additional energy afforded by creation and utilization of a vortex.

U.S. Pat. No. 289,958 to Bevens provides open curved fans on a wheel and causes a jet of water to act upon such fans by impact due to the momentum of the water. The fans of the wheel are thus caused to revolve with essentially the same speed as the issuing jet of water. The surfaces appear designed to utilize centrifugal action to throw off any water from the surface of the wheel which is rotated about a horizontal shaft. Accordingly, there is neither the opportunity for development of a vortex nor the possibility of the utilization of such a vortex contemplated in the reference.

Obrist (U.S. Pat. No. 2,945,960) discloses an outer circular series of fixed secant guide vanes and an inner series of second guide vanes in an inlet guide apparatus surrounded within a concrete housing. A runner, carrying substantially radial vanes with adjustable pitch, is supplied with a whirling stream of water by the inlet guide, and discharges the tail water through a curved suction pipe. No reference is made, however, to the generation of a vortex within the device, nor to the possible use of such a vortex to provide further power to the turbine.

Mariner (U.S. Pat. No. 827,165) utilizes buckets in a hydraulic motor rotating about a horizontal axis, and similarly providing no opportunity for the use of a vortex.

Yet a further reference, Westinghouse (U.S. Pat. No. 754,400) discloses a steam engine wherein a drum with a circumferential series of blades is provided adjacent the exhaust ends of a series of supply nozzles.

In summary, none of the prior art known to the inventor either suggests or discloses the use of vortex properties of water for generation of mechanical energy.

SUMMARY AND OBJECTS OF THE INVENTION

It is, accordingly, an object of the present invention to overcome the deficiencies of the prior art and to provide an apparatus for converting liquid pressure to motive power utilizing the effects of a vortex created within the the liquid.

It is a more specific object of the invention to provide a turbine apparatus employing therein means for enhancing the creation of a vortex, as well as means reacting to the vortex for enhancing the output of the turbine.

Yet another object of the invention is the provision of an apparatus incorporating a drum-like structure for receiving a fluid from one or more nozzles, the drum attached to a central vertical shaft incorporating rotary bearings, to provide rotary motion of the drum responsive to application of fluid pressure from the nozzle.

It is still a further object of the invention to provide a turbine with a drum-like receptacle for enhancing the creation of a vortex within a fluid injected into the drum by a nozzle, the drum structure including a downwardly narrowing cross-section for enhancing such a vortex.

It is still another object of the invention to provide a turbine with a drum-like receptacle having a structure similar to a wash basin for enhancing the creation of a vortex.

It is an additional object of the invention to provide a turbine having a drum with an upper opening for receiving fluid under pressure, and a lower opening for discharging said fluid substantially under the effects of a vortex, the drum having a plurality of lugs disposed on the upper portion of its interior surface, adjacent the upper opening, for reacting to the pressurized fluid.

It is a further object of the invention to provide a turbine with a drum having a plurality of lugs along its upper inward surface, the lugs having a fluted face presented to the pressurized fluid, and further having curved notches in the upper portions thereof for accommodating the tips of nozzles used to inject the fluid into the drum.

It is yet another object of the invention to provide a turbine with a drum which incorporates a vortex enhancing portion. The drum includes means reacting to the vortex which include small vanes disposed along the inner vertical portion of the drum and oriented to react to the vortex by applying additional rotary force to the drum.

Yet another object of the invention is to provide a fluid turbine apparatus incorporating a vortex enhancement device therein, wherein the exhausted fluid impinges on an augmenting means for further enhancing reaction to the vortex.

Still a further object of the invention is the provision of an augmenting means in a turbine apparatus. The augmenting means has a raised central portion and downwardly sloping peripheral portion including thereon a plurality of vanes. The vanes are adapted to react to discharged fluid in a vortex by providing still further rotary force to the apparatus.

It is an additional object of the invention to provide a vortex-turbine apparatus wherein a plurality of lugs, disposed along an upper inner surface of a receiving drum, are connected to a central support shaft for the drum by radial arms forming the blades of a fan for creating a downdraft within the drum, thereby minimizing froth, foam and other disturbances in the injected liquid, and further providing an additional downward impetus to the injected liquid for further enhancing the creation of a vortex therein.

Yet another object of the invention is the provision of a vortex-turbine apparatus incorporating a drum and an augmentor therein, the augmentor being attached to the drum, preferably welded thereto by a plurality of stays, the stays forming the blades of a second fan for creating a downdraft in the vicinity of the augmentor.

It is a further object of the invention to provide a vortex-turbine apparatus including a tailings box for exhaust fluids, the tailings box comprising a support for one of the bearings of a central support shaft for a central drum of the apparatus.

Yet another object of the invention is the provision of nozzles for a vortex-turbine apparatus, the nozzles having fluted and highly polished internal structure for minimizing adhesion of water to the inner surfaces thereof.

It is yet another object of the invention to provide a nozzle for a vortex-turbine apparatus having a rounded opening in contact with a liquid supply line for minimizing turbulence of the liquid in flow through the nozzle.

Still another object of the invention is the provision of a vortex-turbine apparatus incorporating a plurality of nozzles directed at a number of lugs on an inner surface of a rotating drum, and a second plurality of nozzles directed at a plurality of lugs disposed along the outer surface of the drum.

Another object of the invention is the provision of a tailings box for a vortex-turbine apparatus including internal and external lugs, the interior surface of the tailings-box being shaped to direct liquid thrown from the external lugs by centrifugal force back towards an augmentor disposed below the drum, for exertion of further liquid pressure and enhancement of power output by the apparatus. Preferably, the liquid is directed from the interior surface of the talings-box both centrally and downwardly towards the augmentor, in a spiral motion.

In accordance with the foregoing objects, the present invention provides a substantially vertical container for a liquid, the container having a reduced bottom opening, a vortex-inducing portion, and a vortex-reacting means for applying a rotary force to the container in response to a vortex therein. The invention further includes a power output means connected to the container for providing power to external receptors therefor in response to rotation of the container by the vortex.

The invention further specifically provides for a plurality of nozzles for injecting the liquid into the container, and a plurality of lugs disposed along an upper portion of the container. Each lug presents a reaction surface to the liquid injected by the nozzles, thus providing a rotary force to the container in reaction to the impinging of the injected liquid thereon. The nozzles are oriented for inducing a vortex in the container. A central supporting shaft passes through, and supports, the container. A tailings container is provided for expended tail liquids, and an augmenting means is attached to the first container for augmenting the rotary force supplied thereto. The augmenting means includes a substantially circular component having a surface which slopes downwardly from a central area thereof to its periphery.

In accordance with yet another form of the invention, a vortex-turbine apparatus includes a substantially vertical container for a liquid, the container having a bottom opening, vortex-inducing means, and vortex-reacting means. The apparatus further includes a power output means connected to the container for providing power in response to rotation of the container. A plurality of nozzles for injecting the liquid and a plurality of lugs, having reaction surfaces presented to the injected liquid, is further provided, with the nozzles oriented for inducing a vortex in the substantially vertical container. A central top supported shaft passes through and supports the container. A tailings container for expended tail liquids is provided. A second set of nozzles is provided for injecting the liquid against a number of lugs disposed on the outer surface of the substantially vertical container; that is, between the container and the tailings container, for providing still further rotary force to the container.

The characteristic features of the invention are set forth with greater particularity in the appended claims. The preceding features, objects and advantages of the invention, together with additional such characteristics, will be best understood from the following description of specific embodiments thereof when read in conjunction with the accompanying drawings.

BRIEF DESCRIPTION OF THE DRAWINGS

FIG. 13 is a detailed view of a pair of lugs mounted on a drum according to the invention.

FIG. 14 shows a relationship between a nozzle and the liquid injected thereby with a drum and lug according to the invention.

FIG. 15 is a partial plan view of the drum according to the invention illustrating the relationship between a jet and the liquid injected thereby and the drum and illustrating the use of radial arms in the structure.

FIG. 16 is a sectional view of an arm along line 16—16 of FIG. 15 illustrating the use of the arms for air deflection.

DETAILED DESCRIPTION OF THE PREFERRED EMBODIMENTS

Figure 1:
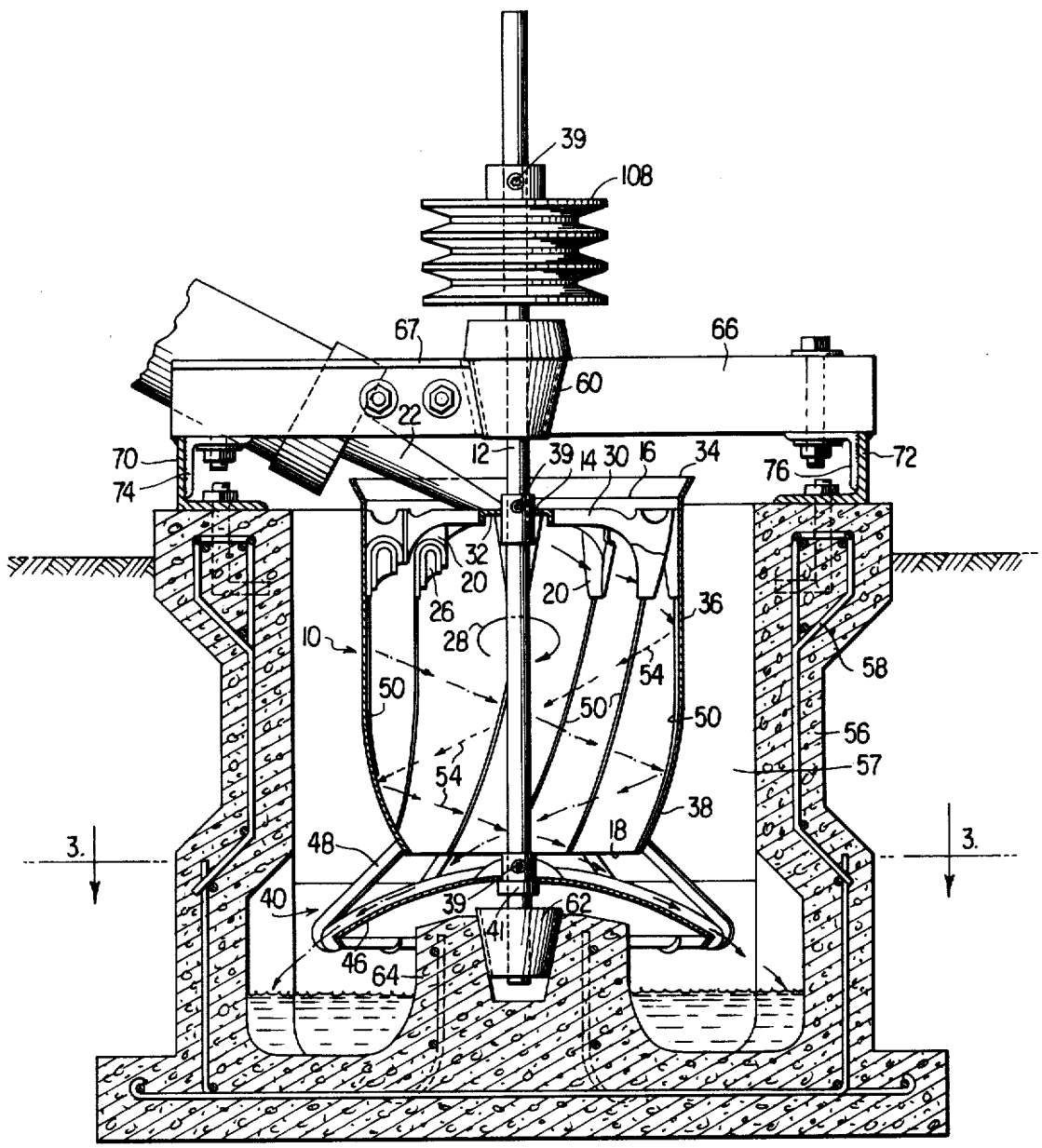
FIG. 1 is an elevational sectional view of a vortex-turbine according to the invention.
Figure 4:
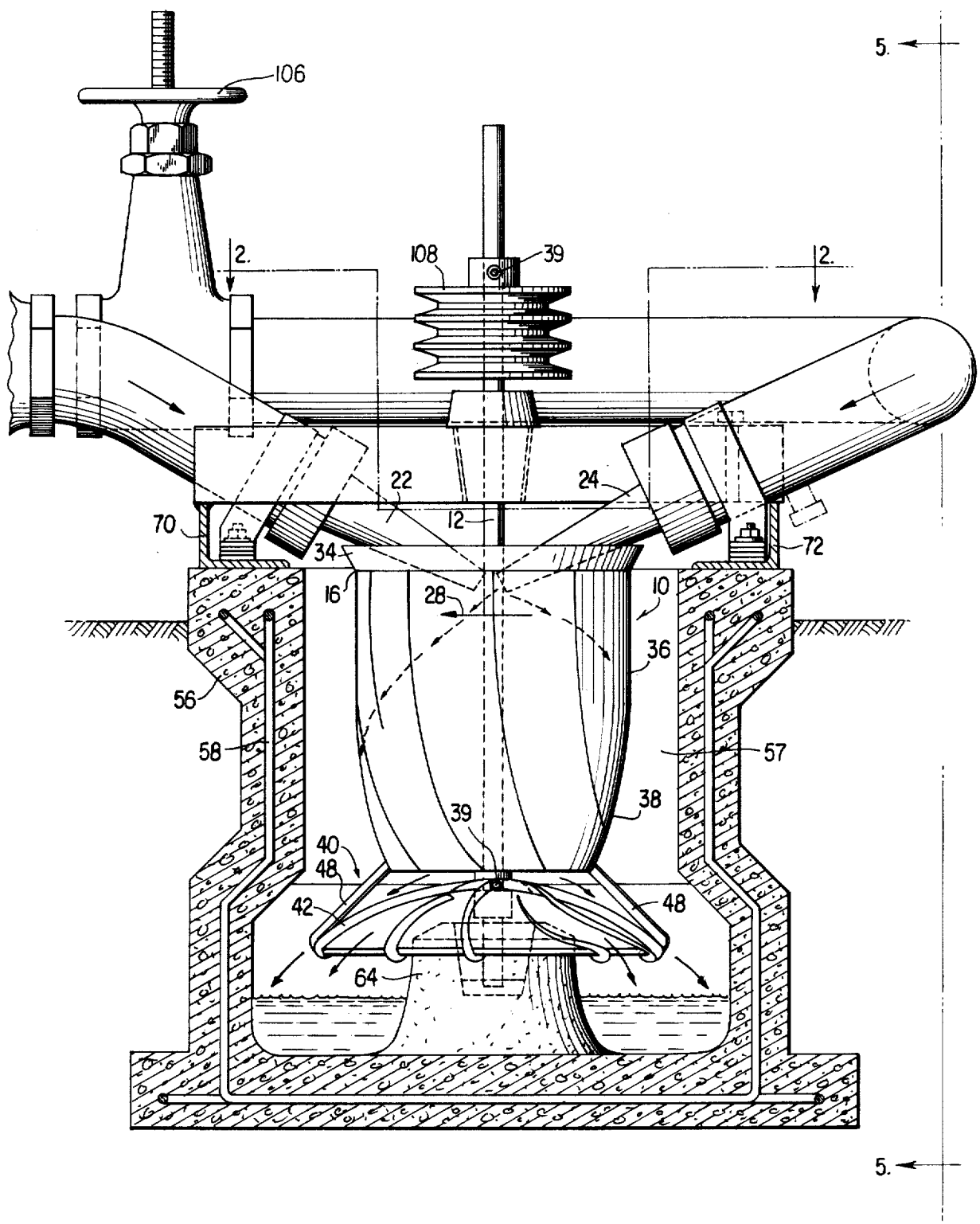
FIG. 4 is a further elevational sectional view of the invention taken along lines 4—4 in FIG. 2, and showing a section line 2—2 for viewing FIG. 2.

Referring now to FIGS. 1–4, a vortex-turbine according to the invention is shown as including a substantially vertically disposed drum container 10, shown in cross-section in FIG. 1 and in elevation in FIG. 4. The drum is mounted to a central shaft 12 by a mounting sleeve 14. The drum includes an upper opening at 16, for receiving a pressurized liquid, and a bottom opening at 18 for discharging the spent liquid. A plurality of lugs 20 are attached to the upper interior surface of the drum for receiving the liquid, preferably water, injected by a plurality of nozzles shown at 22 and 24. Although water is the preferred liquid, it is understood that other fluids may be utilized in the invention.

Figure 2:
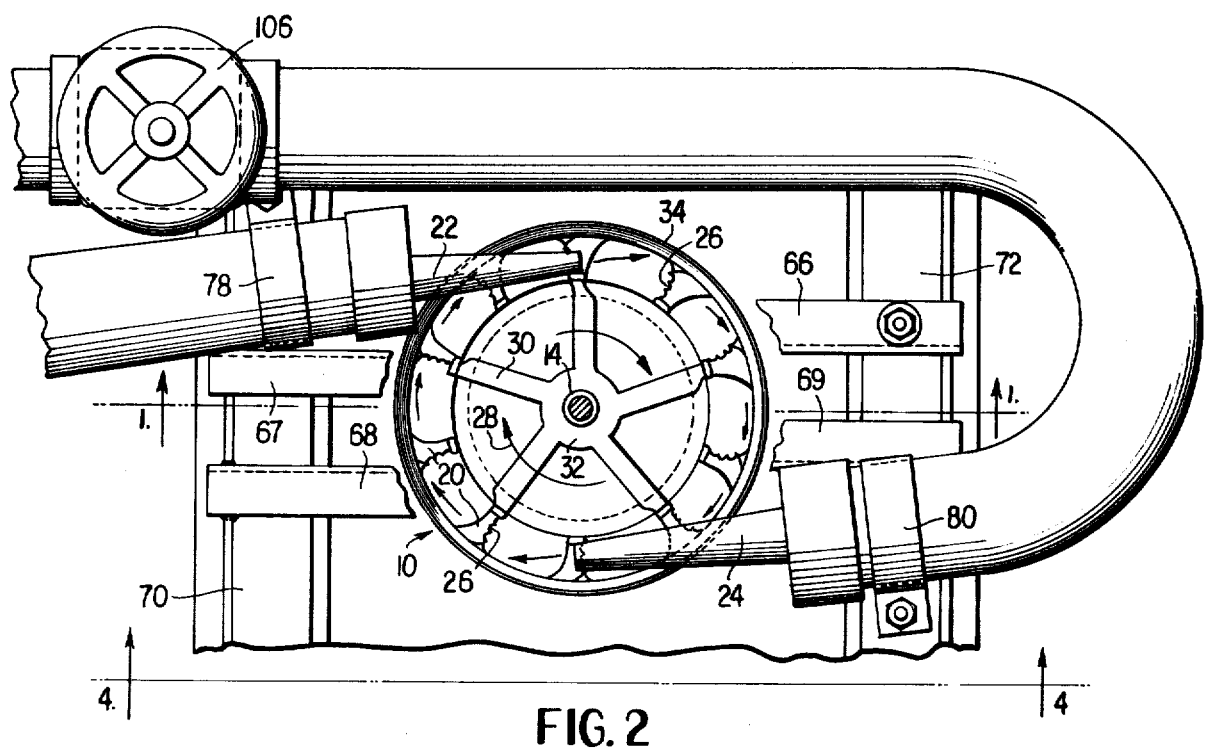
FIG. 2 is a partial plan view of the invention, showing a section line for the view of FIGS. 1 and 4.
Figure 3:
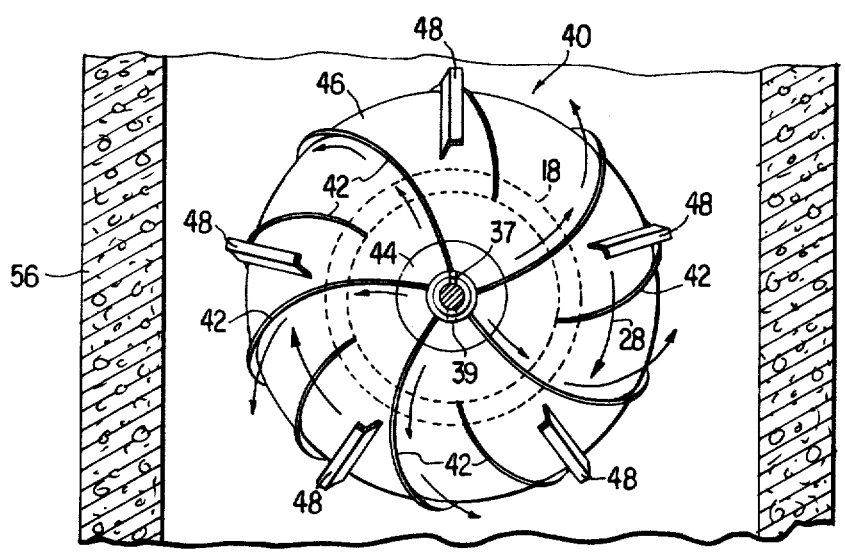
FIG. 3 is a plan view of a portion of the invention taken along lines 3—3 of FIG. 1.

As seen in FIG. 2, the nozzles are oriented to cause injected water to impinge upon the fluted surfaces 26 of lugs 20. In reaction to the impinging water jets, a reactive force is applied against fluted surfaces 26 of the lugs for transmission to the drum. The force is also applied directly to the interior surface of drum 10 by the injected liquid thereby to produce clockwise rotation indicated by arrows 28.

At this point it is significant that the rotation imparted to the drum 10 by nozzle 22 is in a clockwise direction. It is known, for example, that in the Northern Hemisphere of this planet water or other fluids emptying from a container such as a basin or container 10 form a clockwise vortex at the drain. Similarly, in the Southern Hemisphere, such vortices are counterclockwise. The vortices are created by the rotation of the earth and by the resultant force known as the Coriolis Force.

In order to improve the efficiency of a liquid pressure operated turbine, the present apparatus accordingly provides for clockwise rotation of the drum for devices to be used in the Northern Hemisphere, while counterclockwise rotating drums are used in the Southern Hemisphere. Such rotation provides for increased output conversion efficiency by aiding the rotation of the drum due to impinging of the pressurized fluid against lugs 20 by use of the vortices created therein. As is clearly apparent from FIG. 2, for example, placement of nozzles 22 and 24 at the bottom and top portions of the Figure, respectively, along with a reversal of the fluting surfaces 26 from the positions currently shown on lug 20 to the opposite faces thereof, yields the desired counterclockwise rotation of the drum for utilization in environments south of the equator. The remaining discussion is based on the Figures as shown, relating to clockwise rotation for applications above the equator.

The connection of the drum to central shaft 12 is made by a plurality of radial arms 30 connecting a number of lugs 20 to the mounting sleeve 14. The shaft and drum are suspended from the top by a tapered, waterproof bearing as later described. As best seen in FIGS. 2 and 15, the preferred embodiment includes such radial arms from alternate ones of the lugs to a cap 32 connected to sleeve 14.

As shown in FIG. 15, fan blades 30 and cap 32 are welded to a boss 33 for an arbor 35 representing central shaft 12. Boss 33 may comprise the mounting sleeve 14 previously disclosed. The boss and arbor are fixed with respect to one another by the use of a Woodruff key 37, and a set screw 39 therefor, preferably, a flush mounted Allen head set screw. The Allen head set screw is flush mounted to avoid interference with water flow and turbulence, associated with a resultant reduction in power output. Rustproof materials, such as plastic, may be used as a cover to minimize rust formation.

The drum itself may be formed of stainless steel, porcelainized metal, aluminum, galvanized iron, Kevlar or glass fibered plastic, for example. Lugs 20 are preferably formed of polished brass and are brazed to the drum, while the radial arms may be of iron and are preferably welded to the drum. As shown in FIG. 2, for example, ten lugs are utilized along the interior of the drum in the preferred embodiment, which has a diameter of nine inches. The lugs are preferably approximately 2.5 inches long and 1¼ inch wide. The lugs may, of course, be affixed to the drum by welding or by special rivets. In order to contain splashes within the drum, a flare 34 is formed on the drum. The flare may be separately formed and welded to the opening of the drum 16, providing a 60° angle therewith.

In order to enhance the creation of a vortex within the drum, the drum container 10 includes a right cylindrical portion 36 descending from the opening at 16, and a tapering portion 38 providing a successively narrowing cross-section until reaching opening 18. Accordingly, water injected by the nozzles, which are themselves oriented to enhance the creation of a vortex within a drum, is further caused to attain a more pronounced vortex by the successively narrowing cross-section of the drum. This enhancement of the vortex effect is due to the fact that a liquid flowing downwardly through a passage of constant cross-section generally will not form a vortex, but liquid flowing through a narrowing passage or one with an abruptly narrow exit will form a vortex, even if no rotation is imparted to the liquid prior to beginning flow.

Figure 11:
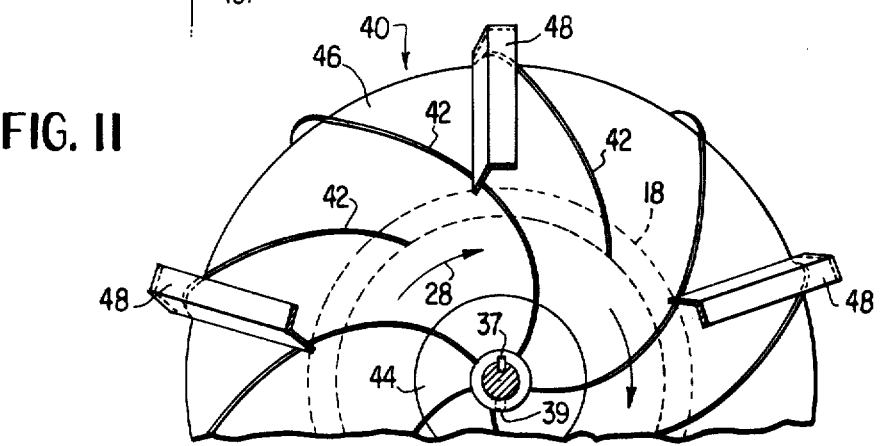
FIG. 11 is a further partial plan view of an augmenting means of the invention.
Figure 12:
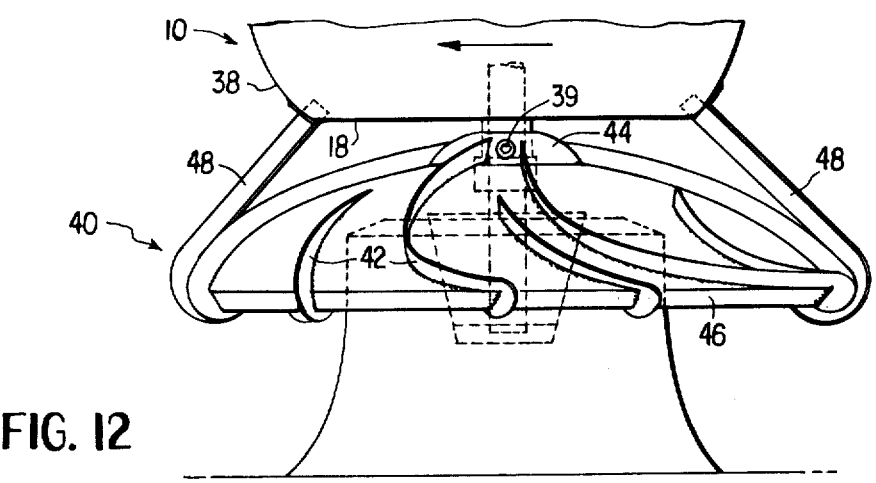
FIG. 12 is an elevational view of the augmenting means of the invention.

The injected water, in addition to clockwise rotation, includes a downward motion component, due both to the force of gravity and to the orientation of nozzles 22 and 24. Such downward motion and momentum is further enhanced by the shape of radial arms 30, which may be stamped to provide a forward pitch in the upward direction, as shown in the cross-sectional view of FIG. 16. The arms preferably provide a forward edge having a width of 1/16 inch and a rear edge having a cross-sectional width of ⅛ inch, and are approximately ¾ inch in horizontal, transverse dimension. As is appreciated from FIGS. 15 and 16, the clockwise motion of the radial arms causes a downward draft within the drum, thereby reducing the formation of bubbles, foam or mist in the injected water. The water thus forms a smooth liquid layer adhering to the inner surface of the drum with the aid of centrifugal force. Consequently, a flywheel effect is produced, wherein the rotating drum is made still heavier by the coating of water adhering to its surface. The fluid, forced downwardly both by gravitational pull and by some of the downdraft created by arms 30, is caused to exit through bottom opening 18 of drum 10 with enhanced velocity. Such downward force is utilized in an augmentor component 40 shown, inter alia, in FIGS. 1, 3, 4, 11, 12 and 18. The augmentor is mounted to the central shaft 12 by a mounting sleeve 41 which is adjustably mounted on the shaft by a further Allen head set screw 39 and a Woodruff key 37. Augmentor 40 includes a portion shaped substantially like an inverted dish, having a raised central portion and downwardly sloping portions towards its periphery. The key and set screw are located above the dish in order to be easily inspected, and to keep rusting to a minimum. The downwardly flowing and clockwise rotating waters, helped by gravity and the centrifugal force, impinge on the augmentor 40 and on vanes 42 provided thereon. The vanes are welded to the inverted dish portion of the augmentor. As seen in the Figures, particularly in FIGS. 3, 11 and 12, the vanes are provided with a downward spiral, in a substantially counterclockwise direction from central cap 44 to periphery 45, when viewed from the top. Accordingly, the vanes will react to water impinging thereon by providing further clockwise rotational force to the augmentor, which is welded to drum 10 by means of a plurality of stays 48. The vanes, forming a set of radial curved blades, are preferably approximately ⅛ inch high for the preferred embodiment. The stays form a second set of fan blades which further forms a downdraft for reducing the air bubbles and foam at the augmentor and for preventing foam within the tailings box enclosing the apparatus from foaming up onto the augmentor 40.

Figure 7:
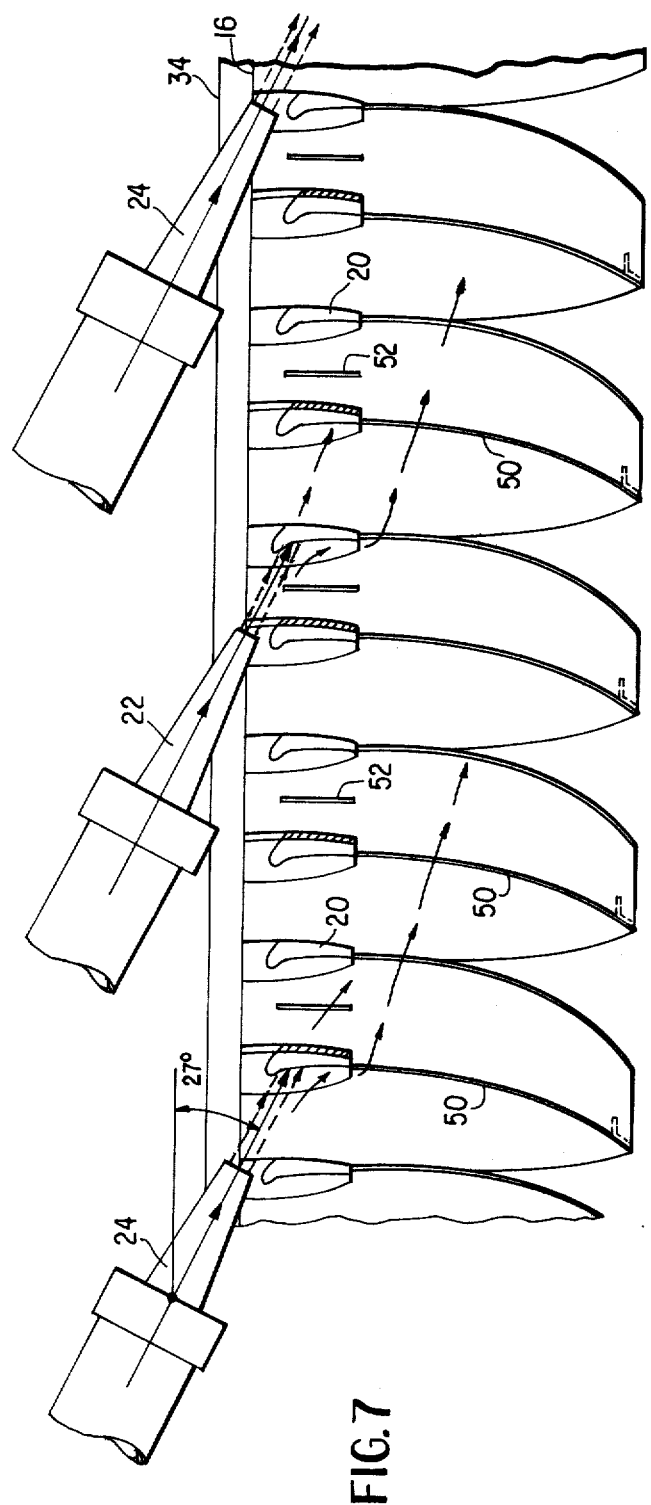
FIG. 7 is a rotated elevational view of the drum interior according to the invention.
Figure 18:
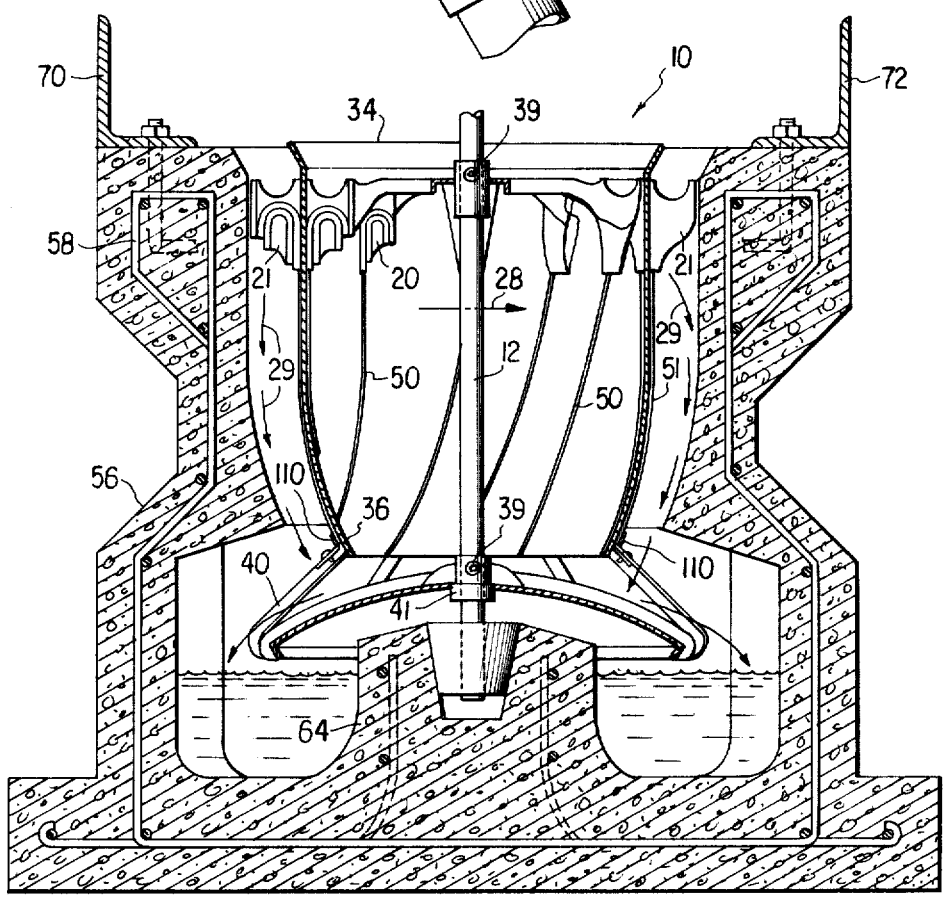

Referring once again to drum 10, a series of wires 50, comprising 1/16 inch brass wire brazed to the drum, or plastic molded with the drum, is provided as shown in FIGS. 1, 7 and 18. The wires react with the vortex induced in the injected water, and are seen to progress downwardly in a substantially clockwise direction from the lugs 20 when viewed in FIG. 7 for the embodiment intended for use in the Northern Hemisphere. It is seen from the Figures that a clockwise rotation of a vortex will thus encounter the wires 50 and further enhance the clockwise rotation of the drum 10. A further set of wires 52 is provided intermediate the lugs 20 as seen in FIGS. 7 and 13. Wires 52 similarly comprise 1/16 inch brass wire brazed to the side of the drum and provide further reaction surfaces for water injected by the nozzles.

The wires thus form a set of small vanes on the interior surface of the drum for reacting to the vortex and applying rotary force to the drum. If large vanes were used, undesirable turbulence would result. Use of smaller vanes results in an acceptable ripple, since only a small ripple is required to absorb energy from the rotating water. Wires 52 similarly extract energy from the water.

In operation, the present apparatus is seen to receive the injection of pressurized liquid, preferably water, for impinging upon a plurality of lugs within a drum, thereby causing the drum to rotate in a clockwise direction. The water rotates in a clockwise direction as is indicated by arrows 54 in FIG. 1 for the water injected by nozzle 22. The dashed arrows 54 indicate the path of water on the inner surface of the drum which is cut away in the view of the Figure. Narrowing of the drum diameter provides a basin effect and enhances the formation of a vortex within the drum, and any such whirling and rotation of the water within the drum provides a further clockwise force in reaction with wires 50. Radial arms 30, forming fan blades, enhance the downward rush of the liquid which, upon exiting via bottom opening 18, impinges on a plurality of vanes 42 on augmentor 40, thus augmenting the clockwise rotational force imparted to the drum which is attached to the augmentor by a plurality of stays 48. The stays form a second plurality of fan blades, thus further enhancing the downward flow of the liquid. Both sets of fan blades are further useful in minimizing frothing and the like, thus providing for smooth flow of the liquid. Advantageously, the horizontal projection of the augmentor is 11 inches in diameter for increased leverage, while the drum is 9 inches in diameter having a bottom opening of 6⅛ inches diameter, thus providing for an additional surface area on the augmentor to react to the water exiting the drum.

The exiting, or tail water, is collected in a tailings box 56, preferably formed of precast reinforced dense concrete for stability. The tailings box 56 includes a sliding gate, positioned at the rear of the apparatus, as shown at 57 in FIGS. 1, 4 and 5. The sliding gate functions to keep debris out, as well as to lessen any spray emanating from the tailing-box. Reinforcing bars 58 are shown in the Figures. The tailings box 56 includes an elevated, central support section for central shaft 12. The shaft is supported by a pair of tapered bearings 60 and 62, bearing 62 being imbedded in the central support 64 provided therefor in the tailings box. The top bearing provides the main support for the shaft, with the bottom support used primarily for lateral thrust support. The bearings are tapered in such a direction as to insure that the central shaft 12 and the augmentor and drum attached thereto are firmly supported within the tailings box in view of the added weight of the structure provided by the injected liquid.

Figure 6:
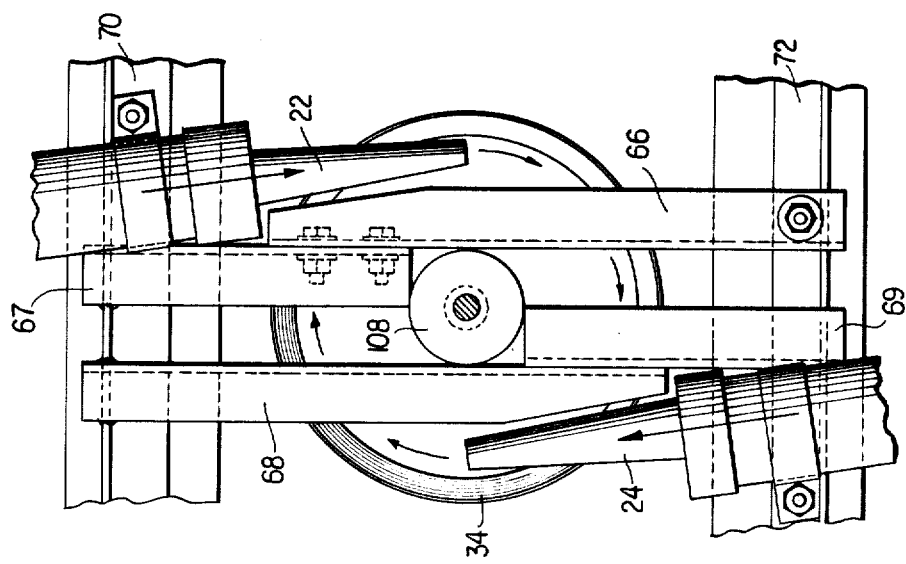
FIG. 6 is a partial plan view taken along line 6—6 of FIG. 5.

As seen in FIGS. 1 and 4, the main upper tapered bearing 60 is supported by structural members 66–69, including cross channels 66 and 68 and continuing segments 67 and 69 therefor. For clarity, certain portions of the structural members are omitted in the view of FIG. 2. Structural members 66–69 are supported on angles 70 and 72 by welded L-clips 74 and 76 shown in FIG. 1. In the preferred embodiment seen in FIG. 6, for the purpose of assembly, a pair of bolt assemblies including lock washers and nuts are used to couple cross channel 66 to continuing segment 67, while cross channel 68 is welded to continuing segment 69. The use of nuts and washers to connect channel 66 to segment 67 permits removal of channel 66 to access the arbor and bearing, for removal of shaft 12 when required for maintenance and repair. Wherever possible, all parts are welded to assure the integrity and rigidity of the present structure. Preferably still, the nuts and lock washers connecting cross channel 66 to continuing segment 67 are themselves welded. A further bolt, nut and washer are used to bolt together the cross channel 66 to L-angle 72, as seen in FIGS. 1 and 6.

As shown in FIG. 2, nozzles 22 and 24 are positioned by line straps 78 and 80, respectively, shown as surrounding the head feed in lines for the nozzles and bolted to the continuing angles 70 and 72, respectively. These straps enable small adjustments of the nozzles.

Figure 9:
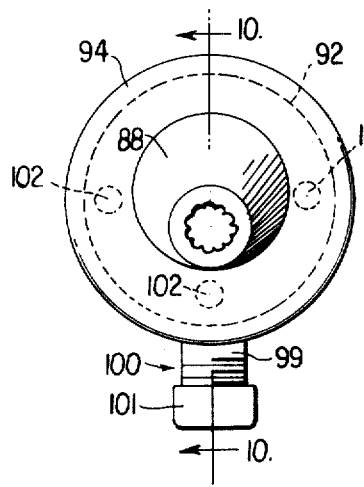
FIG. 9 is a front view of a nozzle used in the invention.
Figure 10:
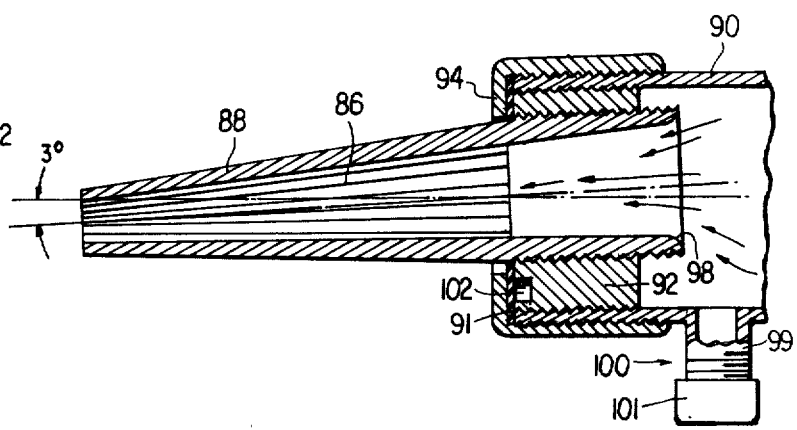
FIG. 10 is a sectional view of the nozzle along lines 10—10 in FIG. 9.

The lugs 20 are provided with curved notches 82 shown at the upper surfaces thereof and most clearly seen in FIG. 14. The notches are provided to accommodate the nozzles, nozzle 22 being shown in FIG. 14. The nozzle structure itself, as most clearly shown in FIGS. 9 and 10, includes an orifice 84 at the discharge end of a conduit 86 formed by a tapered funnel 88. The funnel 88 is preferrably formed of brass, and, as seen both in the end view in FIG. 9 and the sectional view of FIG. 10, is internally fluted in order to provide streamlines of flow of the liquid therein. In order to reduce friction between the liquid and the inner surface of funnel 88, the interior surface is chrome plated and highly polished. The funnel 88 is tapered, having its longitudinal axis downwardly inclined at an angle of approximately 3° with the horizontally oriented longitudinal axis of head feed line 90. The nozzle is externally threaded at its wider end. An eccentric plug 92 has mating threads for accepting the nozzle, and external threads thereon for mating with internal threads provided on head feed line 90. To provide a seal for the head feed line, a pipe cap 94 threadedly engages exterior threads of the line 90 and compresses a gasket 96 against eccentric plug 92. Further, the several threaded couplings involved are all caulked. In order further to reduce friction encountered by water passing along the interior portion of surface 88, as well as to reduce turbulence in the water flowing in the nozzle, the line and opening of the nozzle is provided with a rounded, flared cross-section as seen at 98. As seen in the Figure, the nozzle intake is smaller than the full line diameter. Since the flowing liquid in the large feed line 90 develops less friction, and thus more force, toward the center of the line, the present nozzle intake is seen to utilize the increased force by the above-described shape. A clean-out plug 100 is provided for sedimentation accruing at the nozzle due to the source of the water and to rusting of the pipes, so that no sand, bits of brass, or other materials will damage the polished nozzle or lugs. The plug includes an opening to the head feed line formed in an externally threaded connector 99, and a cap 101 sealing the connector. Cleanout plug 100 is also shown, in phantom, in FIG. 4. The eccentric plug 92 is provided with a plurality of holes 102 for a spanner wrench, the holes 102 to be used in adjusting the placement of the plug and thus of the nozzle. After positioning of the plug, pipe cap 94 and the appropriate packing therefor, is screwed on the assembly.

As is seen from FIG. 14, the nozzle 22 (representative of any of the plurality of nozzles utilized in the invention) fits and passes through the curved notch 82 formed in the upper portion of each of lugs 20 in the drum. As the lugs rotate by the nozzles, the water impact area changes. The changes in impact area are most clearly seen in FIGS. 13–15 where, upon first encountering a lug, the outline of the water impact area is shown by a circle marked W in FIG. 14. For convenience, FIGS. 13–15 show a stationary drum and a moving water flow generated by a nozzle, shown in phantom lines in FIGS. 13 and 15.

Upon first encountering a lug 20, the flow of injected liquid is indicated by circle W in FIG. 14 and by centerline W—W in FIGS. 13 and 15. In this first encounter, fluid initially passes over a lip 104 provided in the upper surface of the lug, as well as impinging against the upper portion of the fluted surface. The portion of the water passing over the lip sprays the drum, while the portion impinging on the lip 104 provides rotary force to the drum by way of arms 30. As the drum rotates, the water impact area drops to the circle labeled Z in FIG. 14, as indicated by lines Z—Z in FIGS. 13 and 15. The flutes 26 provided on the lug are used to direct the impact of the pressurized water towards a sloped inner edge, as well as to provide a small delay in the impact of the water against the lug, which gives off energy.

Figure 8:
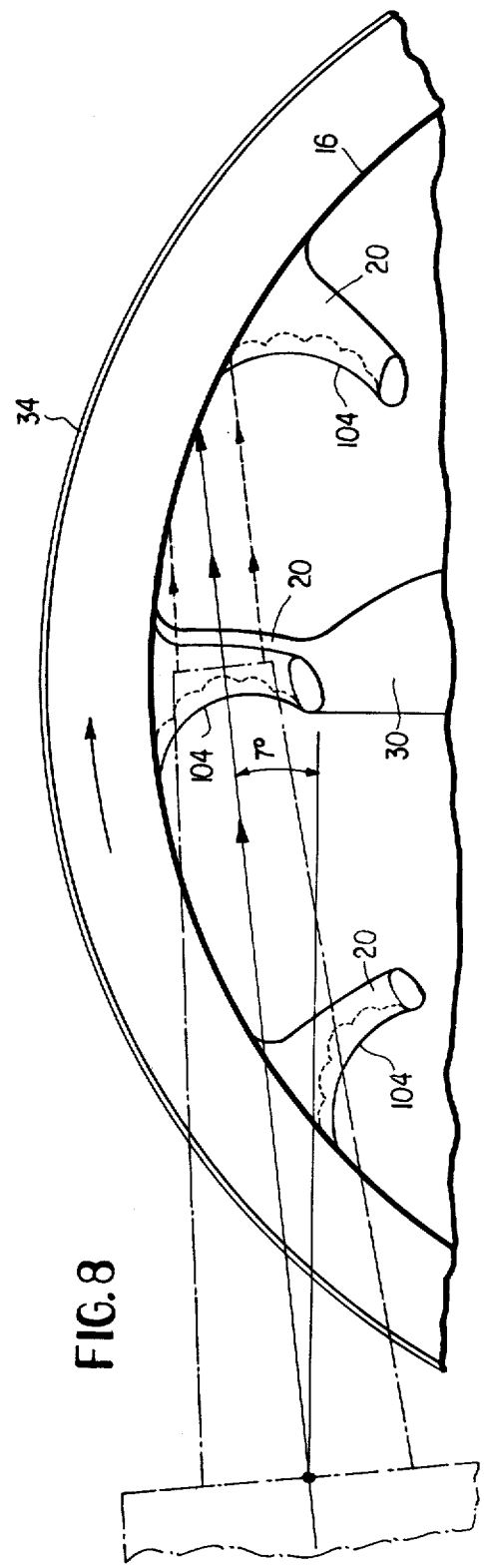
FIG. 8 is a partial plan view of the drum according to the invention.

As the drum continues to rotate, to the water impact area drops to area X in FIG. 14, indicated by lines X—X of FIGS. 13 and 15, providing direct impact against the drum as well as against the brass wires 50 and 52. Of course, the sequence is repeated as the next lug passes under the jetting nozzle. As is apparent from the drawing, the two jets inject water on the lugs simultaneously, and the simultaneous impact serves to smooth and balance the drum rotation. It is seen that the lugs are designed advantageously to provide prolonged impact by the jetting fluid, the lugs including an extended downward portion towards the drum surface. Such a design is advantageously provided with a nozzle design shown at FIG. 10 as including approximately a 3° downward slant with respect to the head feed line and, shown in FIG. 7, disposed at a general inclination of approximately 27° downwardly with respect to a horizontal line. These angles may be adjusted, of course, to correspond with different sizes of drums. With respect to FIGS. 7 and 8, it is seen that as the drum rotates at various times nozzle 24 will project water above a lip (shown at the right end portion of the Figure) and impinge directly on a lip and a lug (as shown at the left end of the Figure). Nozzle 22 will similarly impinge on the lugs, the position shown in FIG. 7 illustrating the impact of water below the lip 104 and the course of the fluid which has been downwardly directed by the flutes thereof as traveling along (and adhering to) the inner drum surface. At the inner surface, brass wires 50 provide further reacting surfaces to the water flow, thereby providing further rotary impact to the drum. As shown in FIG. 8, a nozzle is further directed outwardly by an angle of 7° with respect to a line passing through its wide orifice and parallel to a diameter of the drum which, in the Figure, would be shown as horizontal. Such an orientation provides for travel of the water impact area in FIG. 14 towards the inner drum surface as shown by the progression of areas W, Z and X. Such an outward slant allows the sheet of water to flow back by centrifugal force and to impact directly on the drum in a downward direction. Such operation results in a layer of water on the drum, approximately ¼ inch to ⅜ inch in thickness, at the lower, tapered portion 38 thereof, exerting downward pressure against the drum and dissipating its energy by providing further motion to the drum. As the vortex whirls down the drum side to the opening 18, its speed is faster than that of the drum and the momentum of the water is directed against augmentor 40 in a centrifugal motion providing further rotating impetus to the apparatus. Ultimately, the centrifugal motion, along with vertical gravitational attraction and the cooperating downdrafts created by the two sets of fan blades cause the water to spill off the augmentor and into tailings box 56. The downdrafts created by the fans further provide for the swirling water to impart more of its rotational energy to the drum by being more highly pressurized at the tapered portion 38 and therefore having more highly pressured contact therewith. Additionally, the downdrafts help expel the water out of the tailing box.

It is noted that the vertical orientation of the apparatus provides further advantages, specifically including separation of water from grease at the bearing sites. A tailings pipe carries the tailings water out of the box. The raised concrete base for the bottom bearing is provided at a height sufficient to assure that tailings water will be carried out by the tailings pipe prior to the water level rising, along with any clogging sediment, leaves and the like, to contact the bearing.

The disclosed apparatus is compact, having a 9 inch diameter drum with an 11 inch diameter augmentor as previously disclosed, and utilizing ¼ inch nozzles and a central shaft or axle 12 having a diameter of ⅞ inch. Both the top boss and the augmentor boss are firmly anchored to the shaft. The nozzles are preferably ¼ inch nozzles for supplying water from approximately a 50 foot head pressure, although other sizes may be used, such as ⅜ inch nozzles. Operation is thus at a speed of approximately 500 rpm, preferably in the range of 300–450 rpm, although operation in the range of 500–600 rpm is also contemplated.

Figure 5:
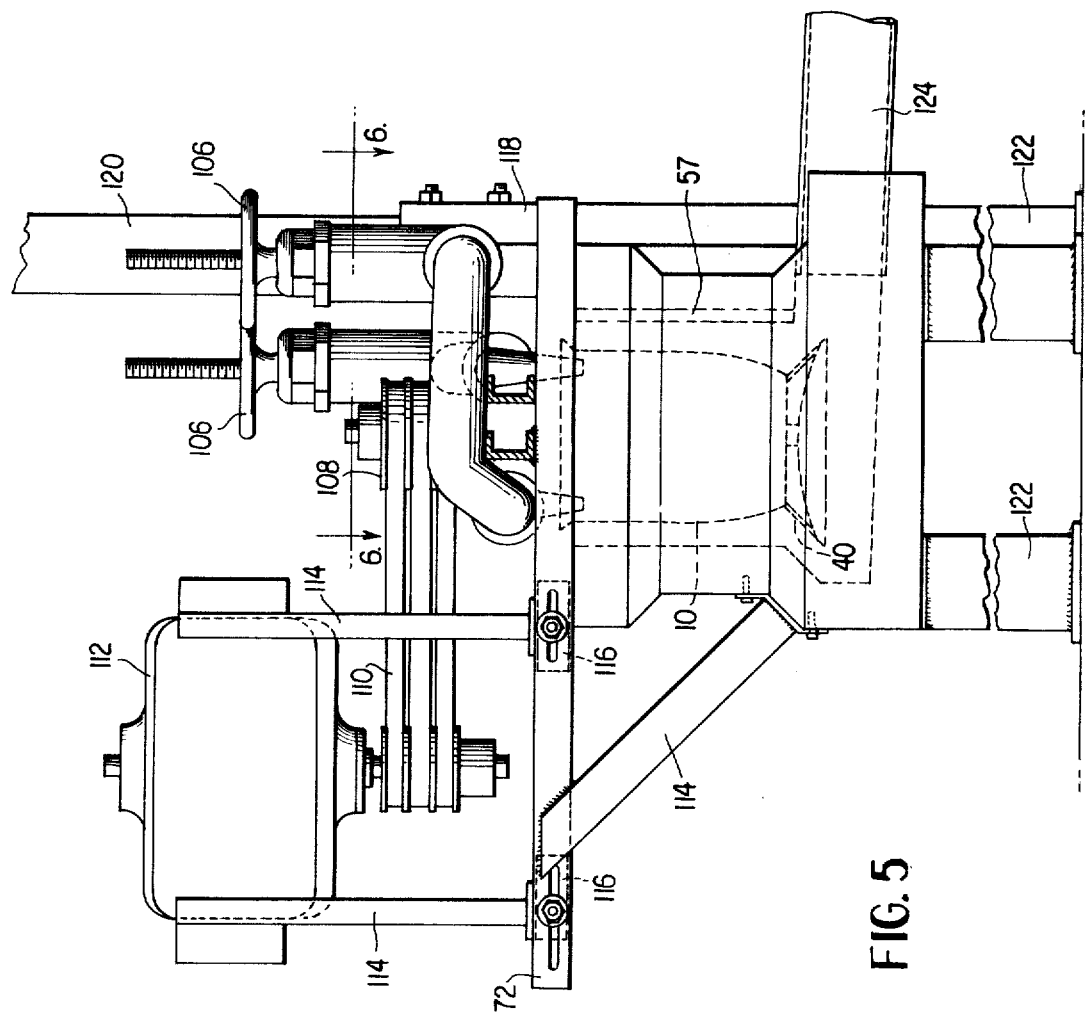
FIG. 5 is a side elevational view of the invention as shown in FIG. 4 along line 5—5, and mounted on floor supports.

As shown in FIGS. 2, 4 and 5, gate valves 106 are provided to control and adjust flow of water to the nozzles individually. A pulley 108 is mounted on central shaft 12, as shown in FIGS. 1, 4, 5 and 6 for transmission of the power generated by the vortex-turbine to an external receiving device. An Allen head set screw 39 provides adjustable positioning for the pulley on the shaft. It is appreciated that other means may be utilized to convey the power generated by the turbine, including conversion means to provide reciprocating or linear output therefrom. In the preferred embodiment, however, the pulley is connected by V-belts 110 to a driven device such as a generator 112 shown in FIG. 5. The driven device, specifically generator 112, is mounted by structural angles 114 to the L-angles 70 and 72. Slide mounts 116 are used to provide for belt adjustment and tightening. Pipe supports 118 are provided, a 4½ inch line 120 being used to connect the turbine to a storage pond or tank at a 50 foot elevation. It is recognized that the larger the diameter of the line, the less friction will be developed. While the operative embodiment of FIG. 5 is substantially identical with that of the remaining Figures, it is noted that in FIG. 5 the apparatus is mounted above ground, by floor supports 122, in a shelter such as a barn, for example, while FIGS. 1 and 4 illustrate a concrete tailings box below ground. FIG. 5 further discloses a discharge chute 124 for the tail water, directing the same towards a storage tank, a cattle watering trough, or a stream for accepting the discharge.

Figure 17:
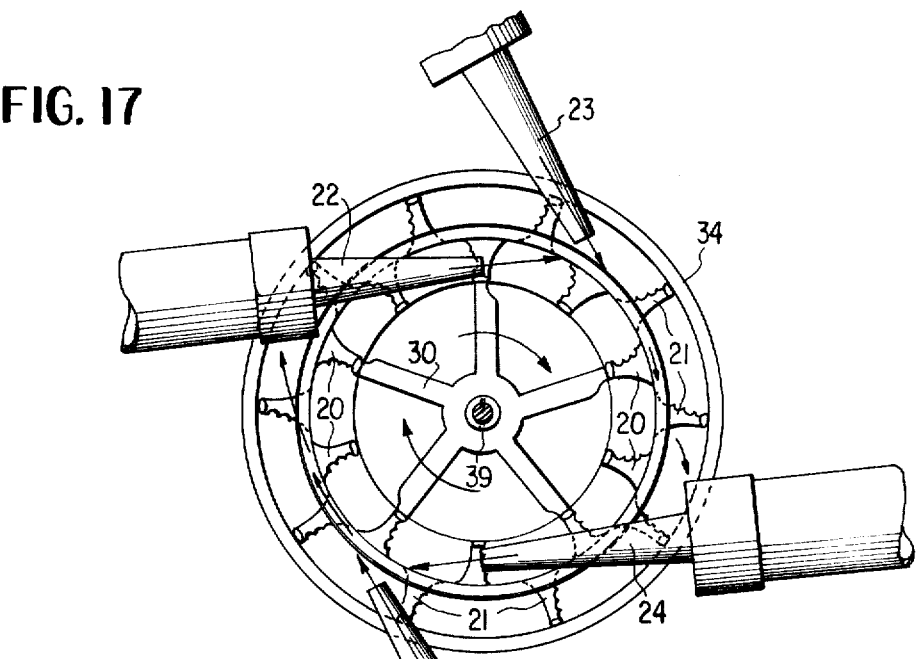

In an alternative embodiment shown in FIGS. 17-18, external nozzles 23 and 25 may be provided for further enhancing the power output of the apparatus. In conjunction with external nozzles 23 and 25, the drum includes external lugs 21 on the external surface of the drum as shown in the Figures. Lugs 21 have substantially the same profiles as do inner lugs 20, are fluted and include curved notches at the upper surfaces thereof. Additional modifications to the structure for further cooperating with external nozzles 23 and 25 includes the addition of 1/16 inch wire 51 on the outer surface of the drum. The wire is placed on the outer surface of the drum with appropriate curvature further to enhance the imparting of rotational torque thereto by the external nozzles.

Upon impacting the drum from the external nozzles 23 and 25, the fluid injected thereto will splash and subsequently be ejected from the drum by centrifugal force, as shown by arrows 29. In order further to utilize the energy of the injected water, it is seen that tailings box 56, preferably formed of waterproof concrete, includes an interior portion shaped similarly to drum 10. That is, the bottom portion of the surface surrounding drum 10 is tapered inwardly to provide a basin effect by having a downwardly decreasing cross-section therein. Accordingly, water impinging on the inner surface of the tailings box is directed back towards the augmentor, to provide further impact energy thereto. The interior surface of the tailings box is honed smooth and should be polished or waxed in order further to enhance and create a vortex in the water passing along that surface toward the augmentor, yet to minimize adhesion to the surface, thereby further enhancing the power output efficiency of the present apparatus.

Since the embodiment of FIGS. 17-18 utilizes the entire inner surface of the tailing box to derive power, a sliding gate is not provided. Rather, an open slot is provided in the lower portion to enable passage of the augmentor therethrough. After passage of the augmentor through the slot, it is attached to the shaft and drum, thus completing the assembly. Towards this end, the drum is provided with lips 110, welded onto its outer, bottom surface, the lip bent toward the fan stay. Matching holes are provided in the lip and stays, for alignment and attachment by short metal screws, either slot headed or bolt headed. For reduced turbulence, the screws preferably do not penetrate through to the interior of the drum, thus leaving a smooth interior surface. For attaching the augmentor stays to the drum, that is, after the Woodruff key and Allen head set screw are in place, the stays should be matched with the lips welded to the drum, which might be done with a nail or wire placed in the matching holes. The screws are then started and pulled in by a long screw driver or socket wrench.

The preceding specification describes, by way of illustration and not of limitation, a preferred embodiment of the invention. It is appreciated that equivalent variations and modifications of the described embodiments will occur to those skilled in the art. For example, in a larger structure, a turbine may have a diameter of 8 to 10 feet, using a 6-inch hose nozzle to provide a flood of water over the drum having a depth from 4 to 6 inches. With such large quantities of water, a heavy flywheel is provided, which may turn at 200 to 300 rpm. A horizontally mounted generator may be used, providing ample power. Such modifications, variations and equivalents are within the scope of the invention as recited in the appended claims, when interpreted to obtain the benefits of all equivalents to which the invention is fairly entitled.

What is claimed is:

1. A fluid-driven vortex turbine apparatus, comprising:
 (a) substantially vertical container means for said fluid, having:
  (1) a bottom opening at a bottom portion of said container means;
  (2) vortex-inducing means for inducing a vortex in said fluid as it exits said container means via said bottom opening at its bottom; and
  (3) vortex-reacting means for reacting to said vortex by applying a rotary force to said container means;
 (b) power output means connected to said container meahns for providing power to external receptors in response to rotation of said container means by said vortex;
 (c) a first plurality of nozzles for injecting said fluid into said container means;
 (d) a first plurality of lugs disposed along an upper, inner portion of said container means, each presenting to said nozzles a reaction surface for providing rotary force to said container means in reaction to said injected fluid impinging thereon;
 (e) said nozzles oriented for inducing a vortex in said container means;
 (f) a central supporting shaft passing through and supporting said container means;
 (g) a tailings container for expended tail fluids; and
 (h) a second plurality of nozzles for injecting said fluid between said container means and said tailings container;
 (i) a second plurality of lugs disposed on an outer surface of said container means for said fluid, for receiving and reacting to said fluid injected between said container means and said tailings container.

2. The vortex turbine apparatus of claim 1 further comprising augmenting means attached to said container means for augmenting the rotary force applied thereto, comprising a substantially circular component having a central area and a surface sloping downwardly therefrom to a peripheral area thereof.

3. A fluid-driven vortex turbine apparatus, comprising:
(a) substantially cylindrical container means for said fluid, having:
 (1) a bottom opening at a bottom portion of said container,
 (2) vortex-inducing means for inducing a vortex in said fluid as it exits said container means via said opening at its bottom, and
 (3) vortex-reacting means for reacting to said vortex by applying a rotary force to said container;
(b) power output means connected to said container means for providing power to external receptors in response to rotation of said container means by said vortex;
(c) a plurality of nozzles for injecting said fluid into said container means;
(d) a plurality of lugs disposed along an upper portion of said container means, each presenting to said nozzles a reaction surface for providing rotary force to said container in reaction to said injected fluid impinging thereon;
(e) said nozzles oriented for inducing a vortex in said container means;
(f) a central supporting shaft passing through and supporting said container means;
(g) tailings container means for expended tail fluids; and
(h) augmenting means attached to said container means for augmenting the rotary force supplied thereto, comprising a substantially circular component having a central area and a surface sloping downwardly therefrom to a peripheral area thereof.

4. The vortex turbine apparatus of claim 3 wherein said augmenting means comprises a plurality of vanes spiraling downwardly from said central area to said peripheral area.

5. The vortex turbine apparatus of claim 3 configured for use in the Northern Hemisphere, wherein said plurality of vanes of said augmenting means spiral downwardly in a counterclockwise direction.

6. The vortex turbine apparatus of claim 3 configured for use in the Southern Hemisphere, wherein said plurality of vanes of said augmenting means spiral downwardly in a clockwise direction.

7. The vortex turbine apparatus of claim 6 wherein said stays include portions sloping downwardly from a forward to a backward section thereof for creating a downdraft therebelow.

8. The vortex turbine apparatus of claim 3 further comprising a plurality of stays connecting said augmenting means to said container means.

9. The vortex turbine apparatus of claim 8 further comprising means connecting said augmenting means to said central support shaft.

10. The vortex turbine apparatus of claim 9 further comprising vanes disposed along said outer surfaces of said container means for said fluid.

11. The vortex turbine apparatus of claim 10 wherein said tailings container includes a curved portion presenting a progressively narrowing horizontal cross-section for directing expended fluid between said container means and said tailings container towards said augmenting means.

12. A fluid-driven turbine apparatus, comprising:
substantially cylindrical rotatable container means, having:
 an opening at a bottom portion of said container means,
 vortex-inducing means for inducing a vortex in said fluid as it flows generally downwardly from a position spaced from said bottom portion and exits said container means via said opening at its bottom, and
 vortex-reacting means for reacting to said vortex by applying a rotary force to said container means;
power output means connected to said container means for providing power to external receptors in response to rotation of said container means by said vortex; and
injecting means for injecting said fluid into said container means;
 wherein said vortex-reacting means includes injection-reacting means located on the interior walls of said container means and presenting reacting surfaces to said injecting means for providing said rotary force to said container means in reaction to said injected fluid impinging on said injection-reacting means.

13. The turbine apparatus of claim 12 wherein said vortex inducing means comprises peripheral walls of said container having a progressively downwardly narrowing enclosed area.

14. The turbine apparatus of claim 13 wherein said peripheral walls enclose a substantially circular cross-section of said container, said cross-section narrowing from a substantially cylindrical portion of said container at a first cross-sectional area to a second, smaller cross-sectional area forming said bottom opening.

15. The turbine apparatus of claim 12 wherein said vortex-reacting means includes a plurality of vanes formed along an interior surface of said container, said vanes progressing downwardly in curvilinear paths towards said bottom opening.

16. The turbine apparatus of claim 15 configured for use in the Northern Hemisphere, wherein said curvilinear paths progress downwardly substantially in a counterclockwise direction when viewed in a rotated, opened elevational view of the interior of said container means.

17. The turbine apparatus of claim 15 configured for use in the Southern Hemisphere, wherein said curvilinear paths progress downwardly substantially in a clockwise direction when viewed in a rotated, opened elevational view of the interior of said container means.

18. The turbine apparatus of claim 12 wherein said injection reacting means comprises a plurality of lugs disposed along an upper portion of said container means.

19. The turbine apparatus of claim 18 wherein said lugs include fluted surfaces along said reacting surfaces.

20. The turbine apparatus of claim 18, wherein said injecting means comprises a plurality of nozzles oriented in a direction for inducing a vortex in said container means, and for impinging said fluid on said lugs and on portions of said container.

21. The turbine apparatus of claim 20 wherein said lugs include curved notched portions at the upper surfaces thereof for accommodating said nozzles in passage thereabout.

22. The turbine apparatus of claim 20 configured for use in the Northern Hemisphere, wherein said plurality of nozzles are oriented to cause said fluid to flow downwardly in a counterclockwise direction along substantially vertical portions of said container means.

23. The turbine apparatus of claim 20 configured for use in the Southern Hemisphere, wherein said plurality of nozzles are oriented to cause said fluid to flow downwardly in a clockwise direction along substantially vertical portions of said container means.

24. The turbine apparatus of claim 20 wherein at least one of said nozzles comprises an internally fluted tapered segment having a first opening for receiving said liquid from a supply line and a second narrower opening for discharging said fluid in the direction of said lugs.

25. The turbine apparatus of claim 24 wherein said at least one nozzle includes a threaded portion in the vicinity of said first opening for threadedly engaging an eccentric plug, said eccentric plug mounted internally of said supply line.

26. The turbine apparatus of claim 25 further comprising a pipe cap for engaging said nozzle and said supply line, and sealing means transverse to the longitudinal axis of said supply line and sealing an opening thereof, said pipe cap compressing said sealing means against said eccentric plug.

27. The turbine apparatus of claim 26 wherein said first opening of said nozzle includes a flared segment for reducing turbulence in flow of said fluid from said supply to said second opening.

28. The turbine apparatus of claim 20 further comprising a central supporting shaft passing through and supporting said container means.

29. The turbine apparatus of claim 28 wherein said power output means comprises a pulley mounted on said central supporting shaft.

30. The turbine apparatus of claim 28 wherein some of said plurality of lugs are connected to said central shaft by radial arms.

31. The turbine apparatus of claim 30 wherein alternate ones of said lugs are connected to said central shaft by said radial arms.

32. The turbine apparatus of claim 30 wherein said radial arms are upwardly pitched at the front edge thereof, for providing a downdraft therebelow.

33. The turbine apparatus of claim 28 further comprising supporting structure therefor including a tailings box for expended tail fluid.

34. The turbine apparatus of claim 33 wherein said container means comprises an opening at a top portion thereof, said top opening having an outwardly and upwardly directed flare and said bottom opening having an inwardly and downwardly directed portion.

35. The turbine apparatus of claim 33 wherein said supporting structure further comprises support beams mounted on said tailings box.

36. The turbine apparatus of claim 35 wherein said nozzles are mounted to portions of said support beams.

37. The turbine apparatus of claim 35 wherein said central shaft is rotatably mounted by a first bearing means to said support means.

38. The turbine apparatus of claim 37 wherein said central shaft is rotatably mounted by a second bearing means to a support formed in said tailings box.

39. The turbine apparatus of claim 38 wherein said first and second bearing means comprise tapered bearings.

40. The turbine apparatus of claim 39 wherein said tapered bearings are waterproof.

* * * * *